United States Patent
Berggren

(10) Patent No.: US 10,392,035 B2
(45) Date of Patent: Aug. 27, 2019

(54) METHOD AND APPARATUS TO DETERMINE STRUCTURAL PARAMETERS OF A RAILWAY TRACK

(71) Applicant: EBER DYNAMICS AB, Falun (SE)

(72) Inventor: Eric Berggren, Falun (SE)

(73) Assignee: EBER DYNAMICS AB, Falun (SE)

(*) Notice: Subject to any disclaimer, the term of this patent is extended or adjusted under 35 U.S.C. 154(b) by 128 days.

(21) Appl. No.: 15/303,271

(22) PCT Filed: Apr. 7, 2015

(86) PCT No.: PCT/SE2015/050414
§ 371 (c)(1),
(2) Date: Oct. 11, 2016

(87) PCT Pub. No.: WO2015/160300
PCT Pub. Date: Oct. 22, 2015

(65) Prior Publication Data
US 2017/0029001 A1 Feb. 2, 2017

(30) Foreign Application Priority Data

Apr. 15, 2014 (SE) .................................. 1450463-3

(51) Int. Cl.
*B61K 9/08* (2006.01)
*G01M 5/00* (2006.01)
(Continued)

(52) U.S. Cl.
CPC .............. *B61K 9/08* (2013.01); *B61L 23/042* (2013.01); *E01B 35/12* (2013.01); *G01B 11/16* (2013.01);
(Continued)

(58) Field of Classification Search
None
See application file for complete search history.

(56) References Cited

U.S. PATENT DOCUMENTS 3,896,665 A * 7/1975 Goel ........................ B61K 9/08
 73/146
4,173,073 A * 11/1979 Fukazawa .............. G01C 15/00
 104/7.2
(Continued)

FOREIGN PATENT DOCUMENTS

CN 102741479 A 10/2012
CN 103635375 A 3/2014
(Continued)

OTHER PUBLICATIONS

Lu, Sheng, "Real-Time Vertical Track Deflection Measurement System" (2008), Mechanical (and Materials) Engineering—Dissertations, Theses, and Student Research. 2.*
(Continued)

*Primary Examiner* — Andrew Schechter
*Assistant Examiner* — Lina M Cordero
(74) *Attorney, Agent, or Firm* — Young & Thompson

(57) ABSTRACT

Method for determining structural parameters of a railway track having a sensor array, includes measuring vertical and/or lateral irregularities of the rail with the sensor array along the rail, thereby providing signals corresponding to geometrical irregularities at different distance from the wheel-load. A model is provided describing the rail's deflection shape, which is dependent on structural parameters of the rail and on the loads on the rail. The model is stored in a processor where geometrical irregularities are compared under different load influence for generating a measured deflection shape. At least one theoretical rail deflection shape is generated using the model by varying structural parameters and the load in the model. At least one of theoretical deflection shapes is compared with the measured deflection shape for each point of the rail, and the structural
(Continued)

parameters of that theoretical deflection shape which best matches the measured deflection shape are determined.

13 Claims, 6 Drawing Sheets

(51) Int. Cl.
  *E01B 35/12* (2006.01)
  *B61L 23/04* (2006.01)
  *G01B 11/16* (2006.01)
(52) U.S. Cl.
  CPC ........ *G01M 5/0058* (2013.01); *G01M 5/0091* (2013.01)

(56) References Cited

U.S. PATENT DOCUMENTS

| | | | |
|---|---|---|---|
| 5,386,727 A | 2/1995 | Searle | |
| 5,753,808 A | 5/1998 | Johnson et al. | |
| 5,867,404 A * | 2/1999 | Bryan | B61K 9/08 342/457 |
| 5,987,979 A * | 11/1999 | Bryan | B61K 9/08 33/1 Q |
| 6,119,353 A | 9/2000 | Gronskov | |
| 6,405,141 B1 | 6/2002 | Carr et al. | |
| 6,668,239 B1 * | 12/2003 | Gilbert | B61K 9/08 34/342 |
| 7,081,824 B2 * | 7/2006 | Gilbert | B61K 9/08 33/285 |
| 2006/0144129 A1 | 7/2006 | Farritor et al. | |
| 2008/0228436 A1 | 9/2008 | Farritor | |
| 2009/0070064 A1 * | 3/2009 | Farritor | B61K 9/08 702/150 |
| 2012/0245908 A1 | 9/2012 | Berggren | |
| 2012/0300060 A1 | 11/2012 | Farritor | |
| 2014/0060190 A1 * | 3/2014 | Mian | G01N 29/12 73/579 |
| 2014/0123761 A1 * | 5/2014 | Turner | G01N 29/11 73/628 |
| 2014/0152814 A1 * | 6/2014 | Farritor | B61K 9/08 348/142 |
| 2014/0180609 A1 | 6/2014 | Berggren | |
| 2015/0235094 A1 * | 8/2015 | Kraeling | G06K 9/00791 348/148 |

FOREIGN PATENT DOCUMENTS

| | | |
|---|---|---|
| SE | 0901526 A1 | 7/2011 |
| SE | 534 724 C2 | 11/2011 |
| SE | 535 848 C2 | 11/2012 |
| WO | 2012/158091 A1 | 11/2012 |

OTHER PUBLICATIONS

Chinese Office Action issued in Application No. 201580024463.4, dated Jan. 30, 2018.
Nov. 23, 2017, EP communication issued for related EP application No. 15780435.2.
International Search Report, dated Aug. 17, 2015, from corresponding PCT application.

* cited by examiner

METHOD AND APPARATUS TO DETERMINE STRUCTURAL PARAMETERS OF A RAILWAY TRACK

The present invention relates to monitoring of railway tracks. By examining an implicitly measured deflection shape under a loaded axle, and comparing with a deflection shape from a model, structural parameter of the track can be determined.

BACKGROUND

A railway track has several properties that need to be monitored to ensure safe travel, some of them geometrical and some of them structural. Certainly there are links between structural and geometrical parameters. Track geometry quality is a set of parameters that describe current geometry of the track such as vertical and lateral irregularities/alignment (vertical alignment is often referred to as "surface" in the USA and "longitudinal level" in Europe), track gauge, cross level and curvature. In the remaining part of the text the term "geometrical parameter(s)" is used for vertical and lateral irregularities/alignment.

Track geometry quality is measured with track recording cars, or by unattended systems fitted on ordinary cars. Measurement frequency can range from e.g. 1-20 times per year depending on safety regulations and maintenance management strategy.

Examples of structural parameters are track stiffness/modulus (both vertical and lateral); clamping force of the fastener between sleeper and rail; stress free temperature of the rails and shear wave velocity of the soil. All these parameters influence the deflection shape of the rail under a given load.

Industrial Relevance and Prior Art of Stress Free Temperature (SFT) and Lateral Stiffness/Resistance Track buckling is formation of large lateral misalignments in railway track, sometimes resulting in train derailments. Buckles are typically caused by a combination of three major factors: high compressive forces, weakened track conditions, and vehicle loads (train dynamics).

Compressive forces result from stresses induced in a constrained rail by temperatures above its "stress free" state, and from mechanical sources such as train braking and acceleration.

The temperature of the rail at the stress-free state is known as the stress free temperature (SFT) (i.e. the temperature at which the rail experiences zero longitudinal force). Initially, the rail's installation temperature or anchoring temperature is the rail's SFT. Hence, at rail temperatures above the neutral, compressive forces are generated, and at temperatures below the neutral, tensile forces are developed. Track maintenance practices address the high thermal load problem by anchoring the rail at a (neutral) temperature of 10-40° C. depending on yearly average temperature. SFT may change over time due to for example track maintenance, geometrical track degradation and lateral track shift in curves.

Weakened track conditions impacting the tracks buckling potential include: reduced track resistance, lateral alignment defects, and lowered rail SFT. Track resistance is the ability of the ballast, sleepers and fasteners to provide lateral and longitudinal strength to maintain track stability. Resistance is lowered if ballast is missing from under or between the sleepers, or from the ballast shoulder. A full ballast section is important, especially in curves. Track resistance is lowered when ballast is disturbed. Tamping (surfacing), sleeper renewal and undercutting operations will weaken ballast resistance to a great extent. Providing longitudinal resistance to the rail/sleeper structure by adequate rail anchoring is important to prevent rail running and hence the decrease of rail neutral temperature.

To prevent track buckling, SFT and track resistance have to be monitored. Currently there exist a couple of methods to monitor SFT e. g.

Cut-method (The rail is cut and the gap is an estimate of SFT). This is a destructive method, a new weld is needed.

A method wherein fasteners are released and rail lifted. Lifting force is proportional to SFT Common to most of the prior art methods is that measurements are taken in one position at a time. This makes the methods time consuming and hence interval between measurements may be stretched (both in time and position along the track).

SE534724C2 describes a continuous method to estimate SFT and track resistance from measurement of track geometry and rail temperature. Two sets of measurements are used from different occasions in order to have a temperature difference.

The present invention is different in that only one measurement at one rail temperature is needed.

U.S. Pat. No. 5,386,727 describes an ultrasonic based method for determining the longitudinal stress in a rail section based on the alteration of an ultrasonic signal transmitted through said rail.

Industrial Relevance and Prior Art Relating to Fastener Clamping Force

In ordered to keep a continuously welded rail in place at correct track gauge, the rails are clamped to the sleepers with a fastener system. Many fastener systems use an elastic clip which holds the rail with a certain force. Sometimes the clamping force may be reduced and the clip may even break. If consecutive clips are missing there may be a safety issue with train derailment as the worst scenario.

One important property of the fastener is that it increases the rail bending stiffness.

Missing clips are traditionally monitored by manual visual inspection. To date there exist a couple of automated systems based on cameras and image processing to find missing clips.

Industrial Relevance and Prior Art of Wheel-Rail Contact Force Measurement

Wheel-rail contact force measurements are used in various applications. Such measurements can be used to find discontinuities in the rail such as a sharp edge at a weld or at the crossing nose of a turnout. It is also often used in the homologation process of new railway vehicles in order to prove safe and comfortable ride and to restrict train-track interaction forces within certain limits.

Wheel-rail contact forces can be measured with strain gauges mounted on the wheels. Also load cells and/or accelerometers mounted in the wheel-set or bogie can be used in different configurations.

Industrial Relevance and Prior Art of Track Stiffness and Track Bed Modulus Measurement Track stiffness and track bed modulus describe how much the track deflects at a given load. Track deflection needs to be within certain limits. Swift changes of track stiffness along the track can often explain maintenance problems.

SE535848C2 describes a continuous method to determine track stiffness/deflection using track geometry quality parameters measured from a track recording car. Two different measurement systems for track geometry quality are used and by comparing them deflection can be found.

U.S. Pat. No. 6,119,353 describes a continuous method to determine track deflection using laser Doppler technique.

US2006144129 discloses a noncontact measurement system for measuring the vertical stiffness of a railway track. The system comprises first and second optical emitters which are mounted to a measuring vehicle and configured to emit beams of light that are detectable on the underlying surface. A camera is mounted to the vehicle for recording the distance between the beams of light as the vehicle travels along the surface. The distance between the beams of light, which is a function of the surface stiffness, is then measured using image recognition techniques.

Industrial Relevance and Prior Art of Critical Speed Determination

Under certain condition of soft soil and high travelling speed of trains (or airplanes take-off or landing on runways) a high-speed phenomenon can take place. When the speed approaches or exceeds the critical wave velocity for the compound track-ground structure, the track response dramatically changes characteristics. Propagating chock waves are generated by the moving load. This causes extensive vibration and large deflection of the ground. The short term solution is to restrict higher speed through affected areas. In order to resolve the problem, different methods to strengthen the soil can be used.

Current methods to detect and quantify high-speed vibration phenomenon include e.g. geo-dynamic testing to determine the soil shear-wave velocity and stiffness/modulus as well as measurement of vibration when a high-speed train is passing. All current methods though, instrument the track and/or soil at a specific location and cannot be used on a running train to monitor larger distances.

SUMMARY OF THE INVENTION

As shown in the background section there exist a number of prior art methods for determining some of the structural parameters of railway tracks. However, these methods are either complex (e.g. require more than one measurement), destructive (e.g. requires a cut of the rail to determine rail stress state), time-consuming (non-continuous methods where only one position along the track is measured) or focused on only one parameter. All prior art methods determines only one structural parameter per method, or requires more than one measurement.

In view of shortcomings of prior art methods relating to determination of structural parameters of railway tracks, the inventor has devised an improved method, by means of which a set of structural parameters is determined at the very same time.

Thus, the present invention relates to the determination of a set of structural parameters of a railway track at the same time with only one passage over the railway track with a measurement vehicle.

The invention is based on looking at and comparing the reaction of the track in terms of the rail deflection shape under influence of different loads. Loads are in all cases the train-track interaction load from the measurement vehicle wheel (s), and (if the structural parameter: rail-stress-state is considered), also temperature induced forces or loads in the rail-steel material). Comparison is done with the theoretical deflection shape of a model which is defined by the structural parameters. By varying the parameters of the model to best possible fit, structural parameters of the track are determined.

The invention is defined by claim 1.

A major advantage over prior art methods is that the present method is performed at one time only, i.e. it is not necessary to perform measurements at different times and/or temperatures.

DESCRIPTION OF THE INVENTION

Figure 1:
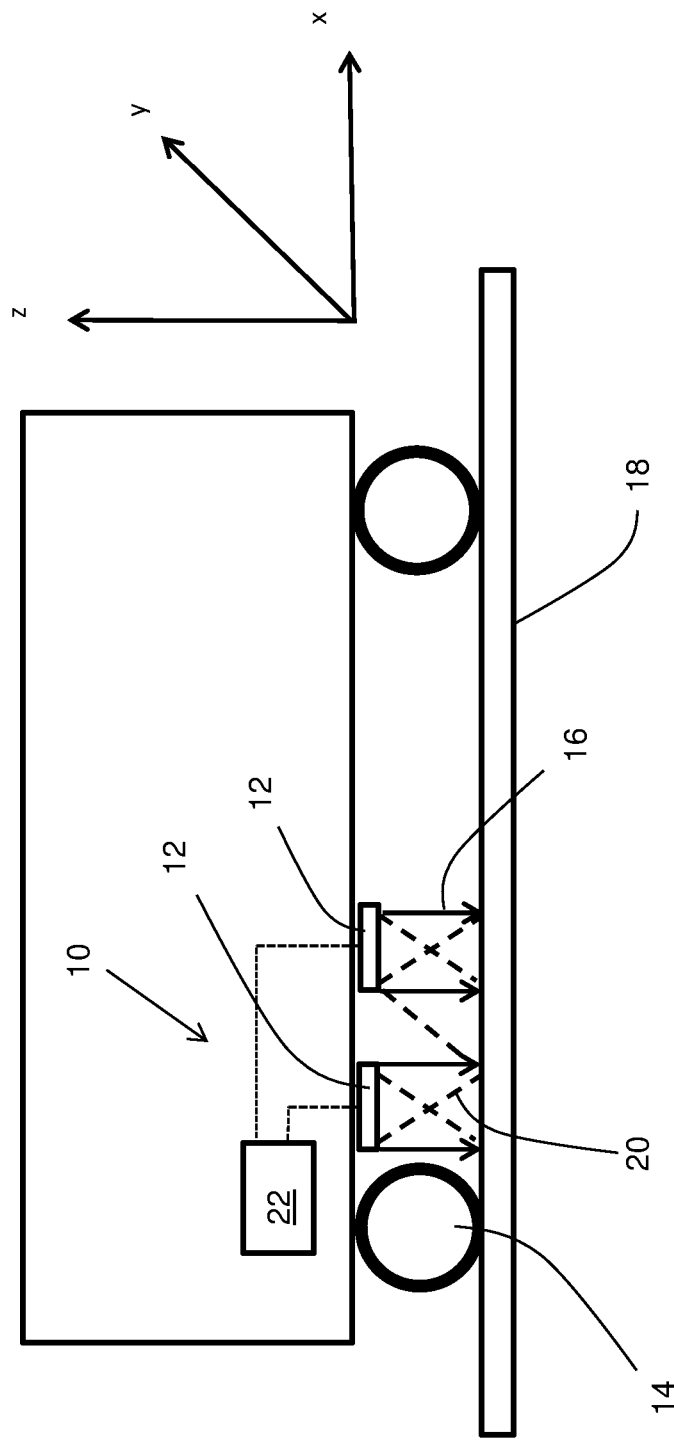
FIG. 1 shows an example of system including a sensor array of laser/cameras fitted under a railway car body.

The invention relates to a method for determining structural parameters of a railway track comprising a sensor array configured to measure the deflection shape of the rail, which is under influence of one or several forces, together with geometrical irregularities. Preferably the sensors are mounted under the car body of a railway vehicle which makes continuous measurements along the rail possible. The deflection shape can also be created from a model where different parameters influence the deflection shape.

The invention thus is in a first aspect a method for determining structural parameters of a rail track using a measurement system comprising a sensor array configured to measure at least the vertical and/or lateral irregularities of a rail under influence of different loads at a plurality of points along the rail, and at different distances from the load/wheel. The sensor array also provides signals corresponding to said rail irregularities, the sensor array being positioned in a railway car adjacent to the contact point between a wheel and a rail; and a processor configured to process the signals from the sensor array. The method further comprises measuring at least the vertical and/or lateral irregularities of said rail with the sensor array along the rail, thereby providing signals corresponding to the geometrical irregularities at different distance from the wheel-load, i.e. under different load influence. A model is provided describing the deflection shape of a rail, wherein the deflection shape is dependent on structural parameters of the rail and on the loads on the rail, said model being stored in the processor. In the processor said geometrical irregularities are compared under different load influence in order to separate deflection due to the wheel load(s) from non-loaded geometrical irregularities, thus generating a measured deflection shape. At least one theoretical rail deflection shape is generated using the model by varying the structural parameters and the load in the model. At least one of said theoretical deflection shapes is compared with said measured deflection shape for each point of the rail, and the structural parameters of that theoretical deflection shape which best matches said measured deflection shape are determined.

The loads are wheel loads and temperature induced longitudinal loads in the rail.

The structural parameters that are determined are selected from track modulus, stress free temperature of the rails, bending moment of the rails, track damping, critical speed of the ground.

The model describing the deflection shape of a rail, is preferably selected from linear or nonlinear beam model with foundation or linear or nonlinear FEM-model.

In another aspect the invention provides an apparatus for determining structural parameters of a rail track having a measurement system comprising a sensor array configured to measure at least the vertical and/or lateral irregularities of a rail under influence of different loads at a plurality of points along the rail, and at different distances from the load/wheel, and to provide signals corresponding to said rail irregularities. The sensor array is positioned in a railway car adjacent to the contact point between a wheel and a rail; and a processor configured to process the signals from the sensor array. The processor being configured to perform the method according to any of claims 1-8, by being setup to run a program. In a preferred embodiment the sensor array comprises sensors on both sides of the wheels in the longitudinal direction.

A static model usable in the invention can include the following parameters:
Wheel-rail force
Rail bending stiffness with extra influence of fastener clip force (proportional to the 4$^{th}$ derivative of the deflection shape)
Temperature induced force of the rail, when the rail temperature differs from the SFT (proportional to the 2$^{nd}$ derivative of the deflection shape)
Track modulus (proportional to the deflection shape)

A dynamic model usable in the invention can in addition include:
Vehicle speed
Inertial terms
Track and fastener damping (proportional to the 1$^{st}$ derivative of deflection by time)
Critical speed of the track By comparing the deflection shape measured by the sensors with the deflection shape calculated from the model, varying the parameters of the model to best possible fit, the structural parameters of the track can be determined.

Other parameters can also be included in the model e.g. a more detailed model of track modulus to separate the pad stiffness of the fastener from ballast and substructure modulus.

As different structural parameters are proportional to different orders of the deflection shape derivatives, the correlation between measured deflection shape and correlating model deflection shape will not be under-determined and thus solvable.

The sensors could be of different kinds, point lasers, line-lasers with camera and optical triangulation, grid laser with camera and optical triangulation, laser-Doppler measuring velocity (which can be integrated to displacement), distance-radar etc.

Sensors can be placed in boxes/fixtures where the relative motion of the fixtures compared to the rail are measured with accelerometers and gyros.

One example of a measurement setup generally designated 10 is shown in FIG. 1 (direction of movement is the x direction). The setup comprises a sensor array 12 comprising a set-up of lasers and cameras arranged in front of a pair of wheels 14. The four vertical arrows 16 illustrate line lasers lighting a cross-section of the rail 18 and the broken lines 20 illustrate the camera view of the laser line. The sensor array 12 is coupled to a processor 22 configured to process signals from the sensors according to a program for determining structural parameters of the rail.

In the figure, only one rail 18 is shown, but of course both rails can be monitored at the same time with two arrays of sensors.

This described measurement setup is used to determine structural parameters originating from a static model (as described previously). As the deflection shape is symmetric around the wheel (or bogie) only one side of the wheel/bogie has to be monitored.

A non-contact temperature sensor such as an infrared thermometer is used to measure the rail temperature. The sensor or thermometer can then be directed towards the rail web or foot. The temperature sensor ($T_{rail}$) is used to relate determined stress state ($P_{long}$) of the rail to SFT ($T_{sft}$), with denotations from Eq. 2.

The main influencing forces creating a deflection shape, origin from the wheels. One minor influencing force taken into consideration by this invention is the vertical (z) and lateral (y) resultant coming from longitudinal (x) forces when the rail temperature differs from the SFT. This resultant force is proportional to the second derivative of the geometrical deviation with respect to x, the longitudinal elongation of the rail.

One static model that can be used to describe the deflection shape is the Euler-Bernoulli beam on a Winkler foundation with the addition of longitudinal force from a rail temperature different from the SFT shown in Eq. 1.

$$\gamma EI \frac{d^4 w(x)}{dx^4} + P_{long} \frac{d^2 w(x)}{dx^2} + \mu w(x) = Q(x)\delta(x_0) - P_{long} \frac{d^2 s(x)}{dx^2} \quad (1)$$

$$P_{long} = \alpha EA(T_{rail} - T_{sft}) \quad (2)$$

w(x) denotes deflection shape (either vertical or lateral).
s(x) denotes vertical or lateral geometrical deviations. s(x) of equation 1, is considered as non-loaded geometry.
γ denotes increase of rail bending stiffness due to fasteners connecting the rail to the sleepers.
E is the rail-steel elastic modulus.
I is the area moment of inertia of the rail cross section (different in vertical and lateral direction).
$P_{long}$ is the longitudinal force (temperature dependent stress state) of the rail apparent when the rail temperature, $T_{rail}$, differs from the stress free temperature $T_{sft}$ (shown in Eq. 2).
μ denotes the track modulus.
Q denotes wheel-rail force.
$\delta(x_0)$ denotes the dirac-function making sure that Q is only acting at the wheel position $x_0$.
α is the coefficient of heat expansion of rail steel.
A is the cross section area of the rail.
E, I, A and α are considered as material constants although I and A will change slightly if the rail is worn.

More advanced models can also be used using e.g. more advanced beam theory, finite elements, discrete supports of the rail with masses, springs and dampers at sleeper positions, vehicle speed, critical speed of the soil and an appropriate vehicle model to represent the wheel force to mention a few possible expansions.

There exist closed form solutions for equation 1 if the unknown structural parameters γ, μ, and $P_{long}$ are regarded as constants yielding a linear differential equation. Also Laplace/Fourier techniques can be used to solve the equation and compare/correlate with measured deflection.

With varying unknown terms, Eq. 1 becomes non-linear and non-linear numerical solutions are needed.

Figure 2:
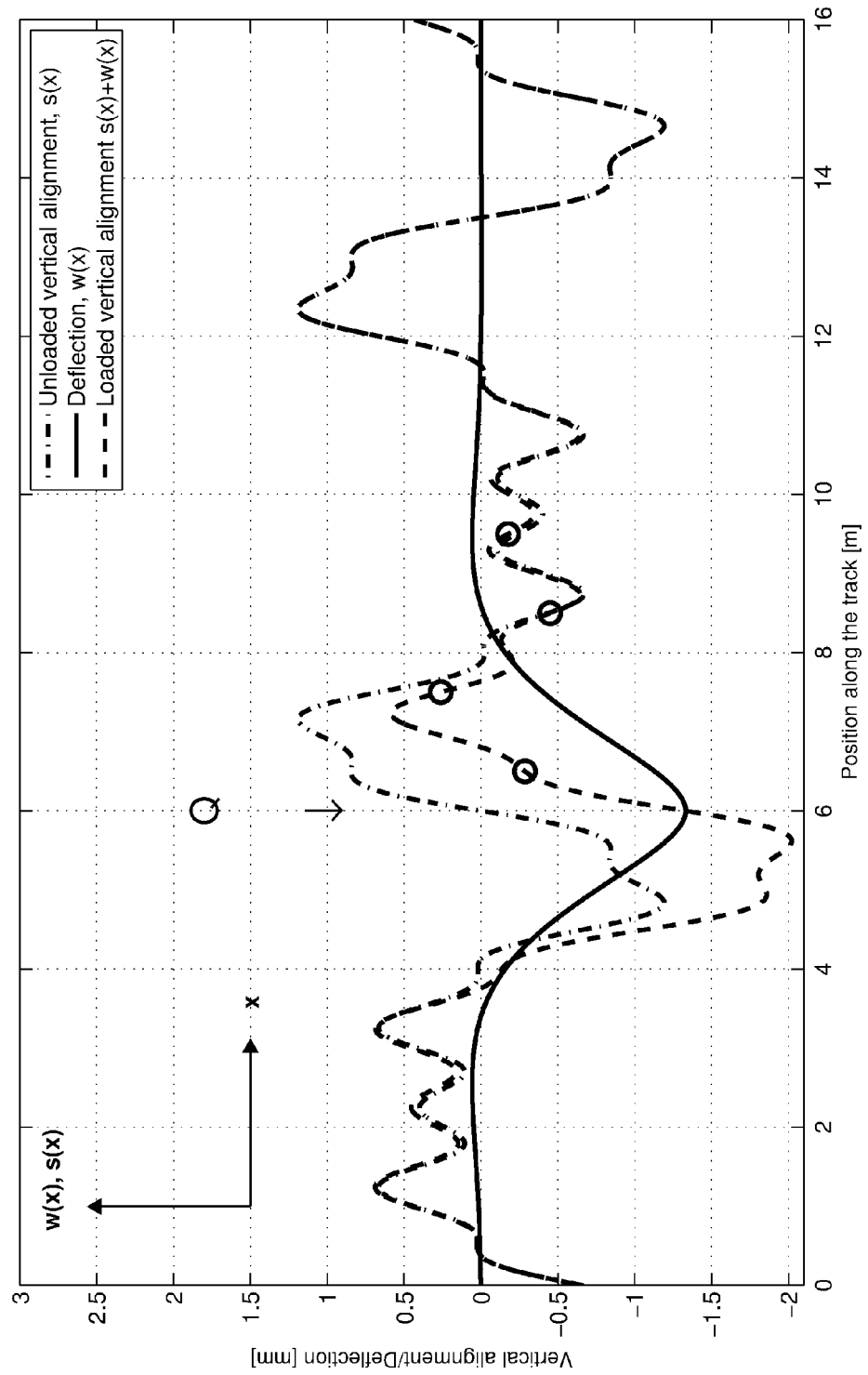
FIG. 2 is an illustration of geometrical irregularities (vertical alignment) (dashed dotted line), deflection due to wheel load Q (solid line) and combination of the two (dashed line)

The displacement sensor array will measure a combination of the non-loaded geometrical irregularities (vertical and/or lateral alignment) and the structural deflection shape as is illustrated with circles in FIG. 2 for a measurement array with sensors at distances [0.5 1.5 2.5 3.5] meters from the wheel. The dashed-dotted line represents the unloaded vertical alignment, which are the geometrical irregularities of the rail before the train is coming. The dashed line represents the loaded vertical alignment when the wheel load is at position x=6 m. The solid line is the deflection shape due to the load at position x=6 m and naturally the difference between the unloaded and loaded vertical alignment.

Figure 3:
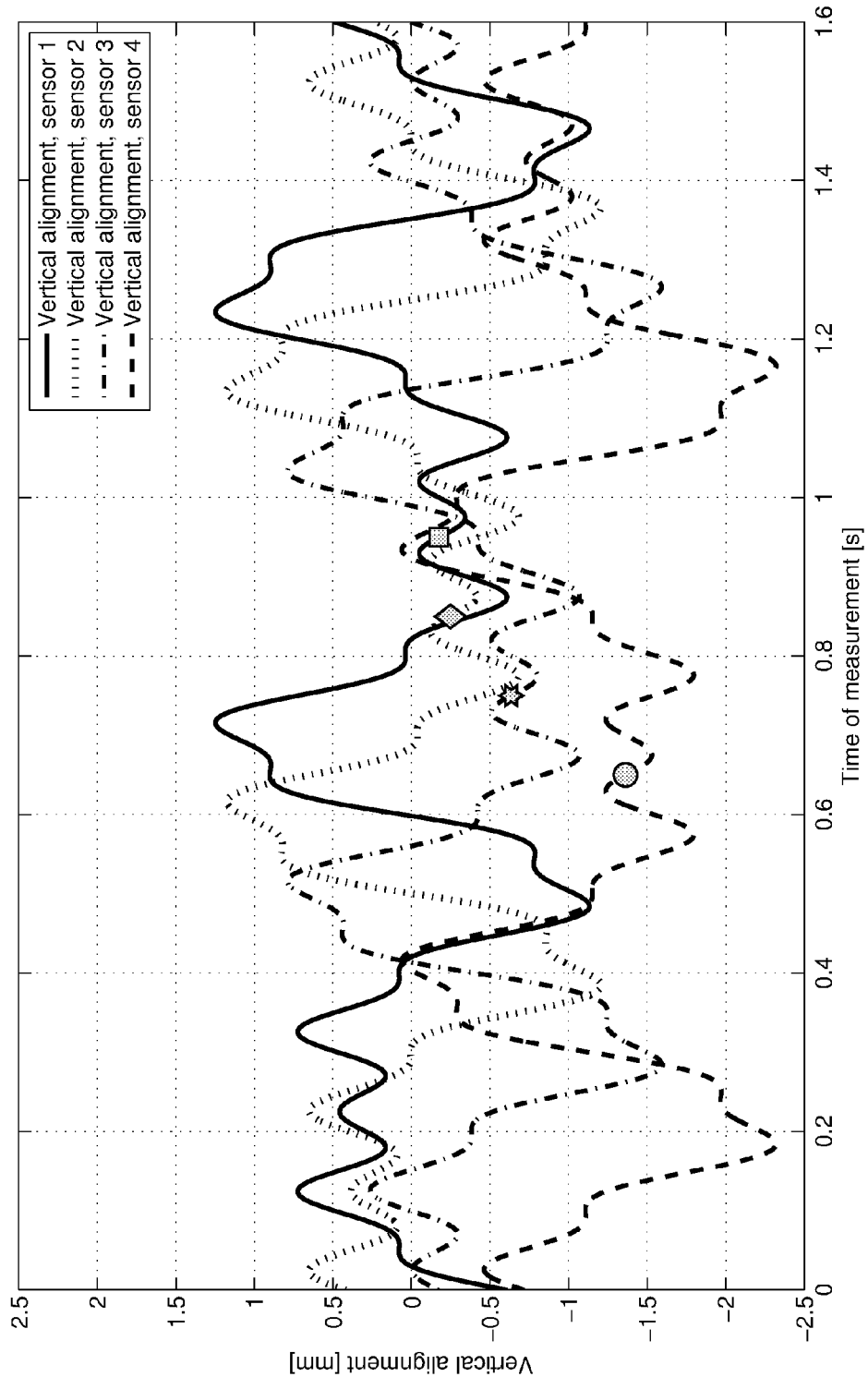
FIG. 3 is an illustration of measured geometrical irregularities (vertical alignment) from four different sensors at different distance from the loaded wheel.
Figure 4:
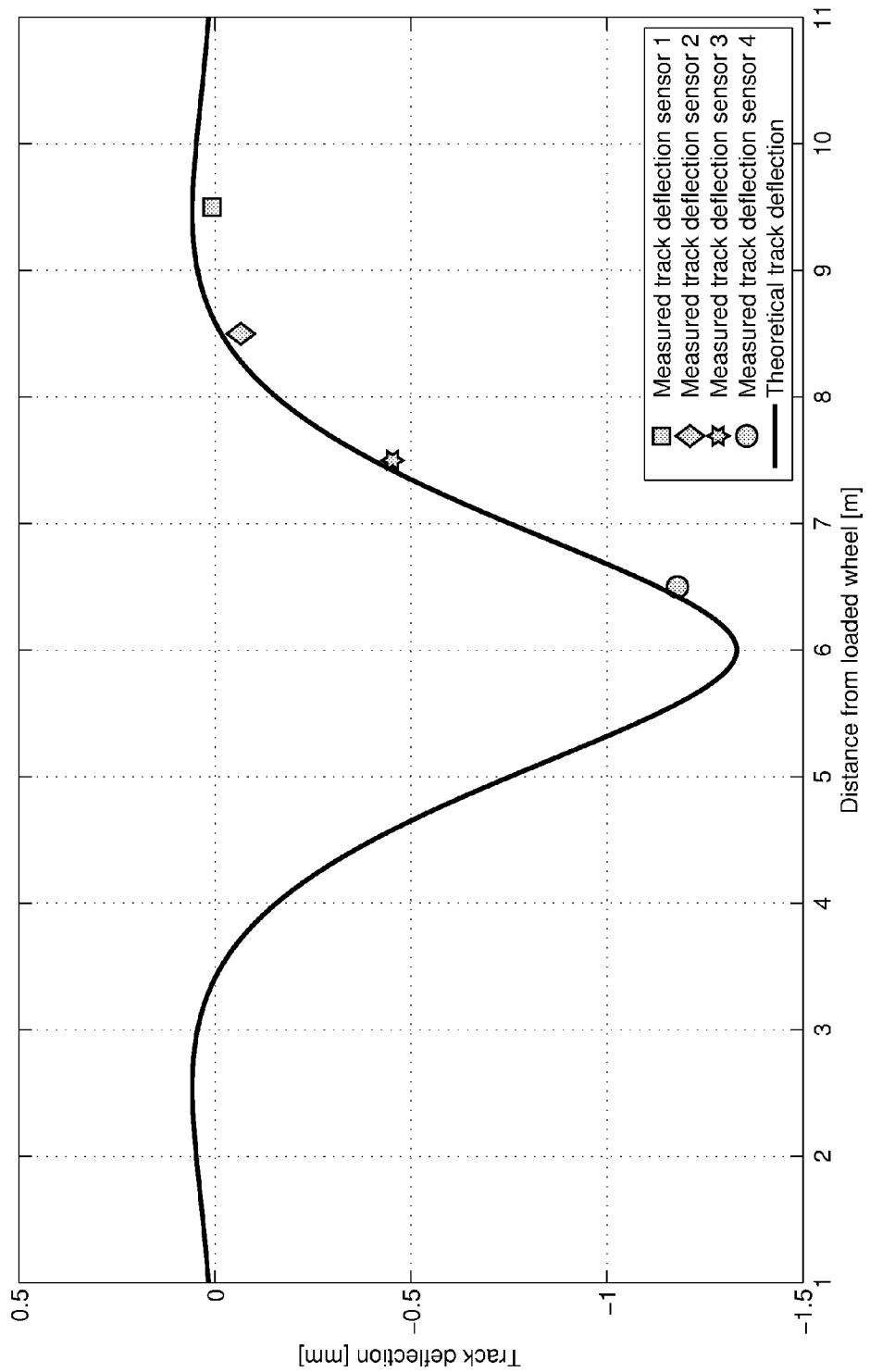
FIG. 4 is an illustration of theoretical deflection shape and measured deflection shape at one position.

An illustration of readings from all four sensors is shown in FIG. 3. One specific position in the track, corresponding to the position of sensor 1 at x=9.5 m in FIG. 2, is illustrated for all four sensors with square (sensor 1), diamond (sensor 2), star (sensor 3) and circle (sensor 4). It is clear that the load influence from the wheel will increase as sensors are placed closer to the wheel. The readings from this position, forming a deflection shape measurement, is illustrated in FIG. 4 where also a theoretical deflection shape from the model in Eq. 1 is shown as a solid line. As a first try, all four sensor readings are adjusted so that sensor 1 has a zero-reading.

As the measurement vehicle moves, each position along the track will have one measurement sample per sensor as illustrated in FIGS. 3-4. Each position along the track will thus have measurements with different influence from the load. This is the basis for separating geometrical irregularities s(x) from deflection w(x).

Figure 5:
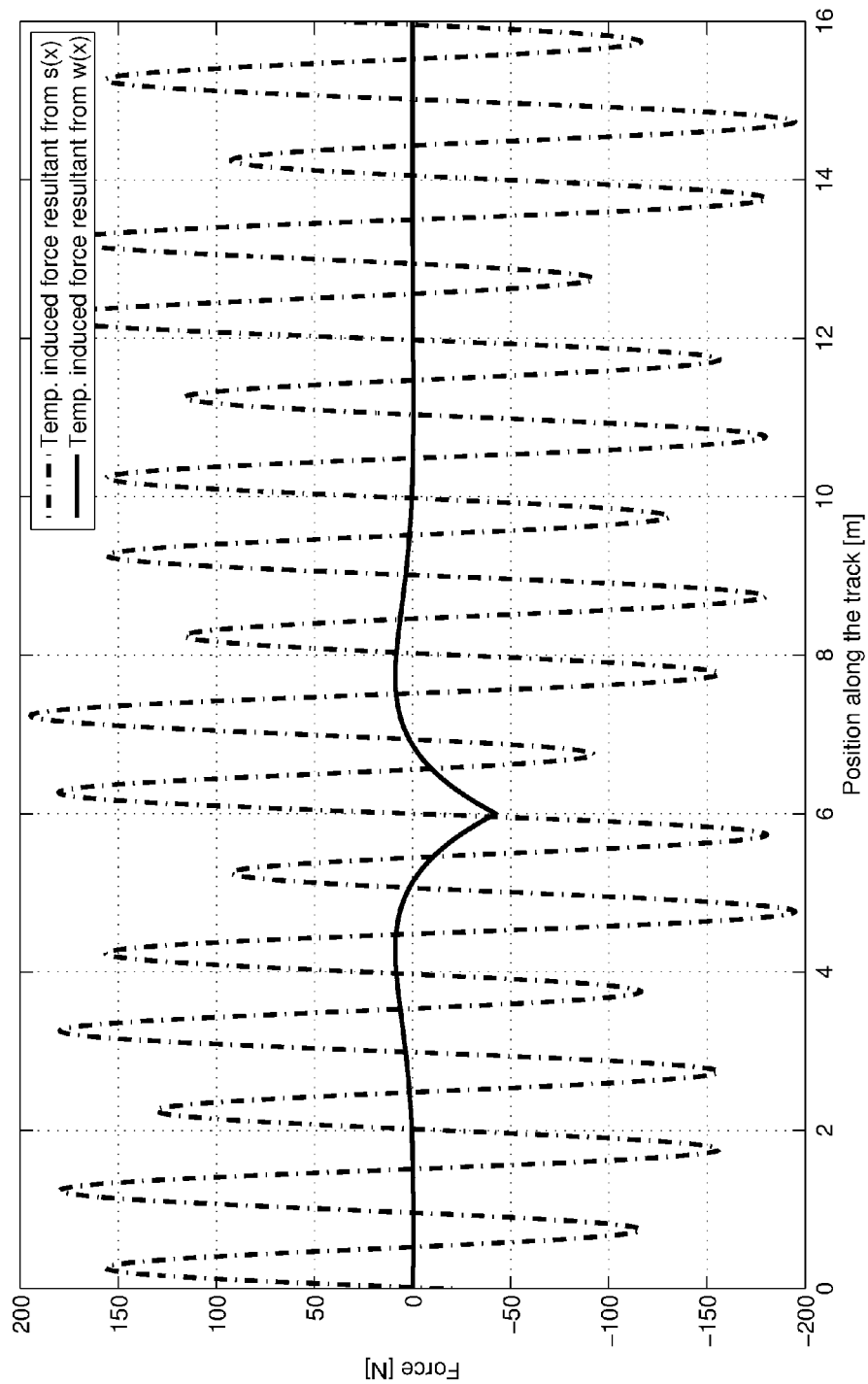
FIG. 5 shows the longitudinal force resultant in vertical direction from geometrical irregularities, s(x) (dashed-dotted line), and deflection, w(x) due to a load in position 0 (solid line) at a temperature 30° C. above SFT.
Figure 6:
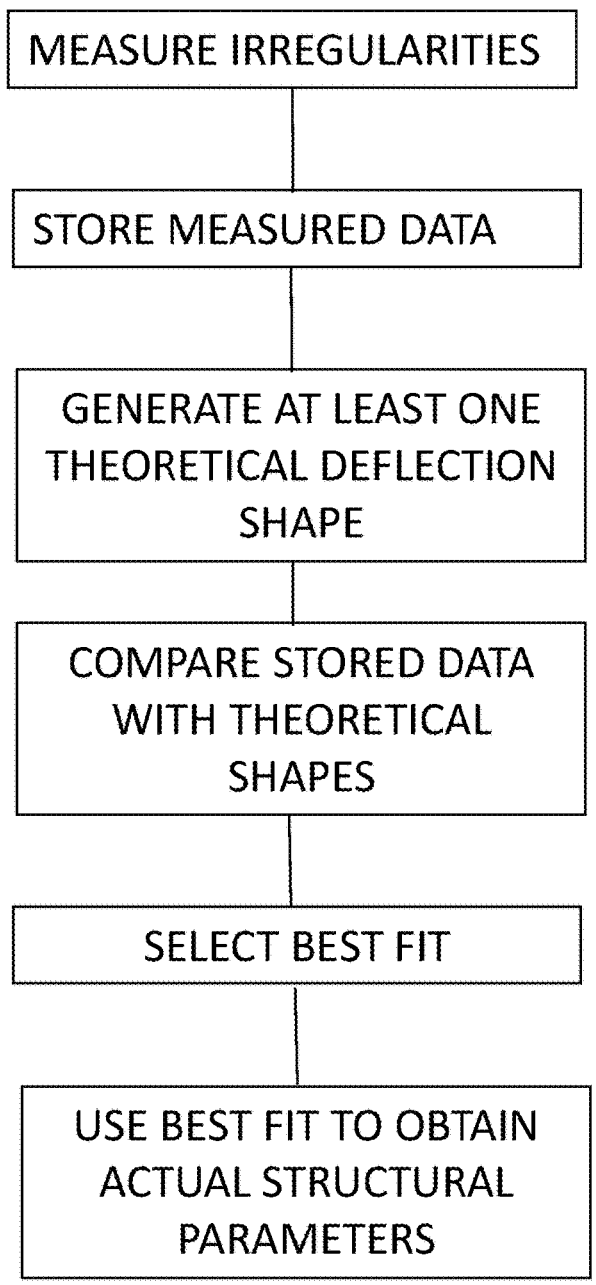
FIG. 6 is a flow chart of the method according to the invention.

If the rail temperature differs from the SFT, longitudinal forces will be present in the rail. Both geometrical irregularities and deflection shape due to a wheel load will cause the longitudinal rail force to have vertical and lateral resultants. The resultants will be proportional to the second derivative of irregularities/deflection shape as shown in Eq. 1. FIG. 5 shows an example of resultant vertical forces with the basis from FIG. 2 and a rail temperature 30° C. above current SFT.

Naturally these extra forces will cause minor extra deflection, which will make it possible to determine the structural parameter of the rail stress state and SFT.

Another measurement setup could be used to determine critical speed of the track. When a train approaches critical speed, the deflection shape under a wheel or bogie will not be symmetric. In order to compare deflection shape before and after the wheel or bogie for critical speed determination, a similar sensor array is mounted on the other side of the wheel/bogie, thus making it possible to detect non-symmetric deflection shape when comparing deflection shape before and after the wheel. The actual speed of the measurement vehicle is measured at the same time to relate the non-symmetric deflection shape with critical speed. Structural parameters are in this case determined with the help of a dynamic model (as described above).

One possible dynamic model is described by the differential equation (3)

$$\gamma EI \frac{\partial^4 w(x,t)}{\partial x^4} + m \frac{\partial^2 w(x,t)}{\partial t^2} + c \frac{\partial w(x,t)}{\partial t} + kw(x,t) = Q\delta(x-vt) \quad (3)$$

w(x,t) is now dependent of both position (x) and time (t). Variables, not already mention previously, are:
  m: equivalent mass of the track per meter.
  c: track damping
  v: speed of vehicle Solving for critical speed with prior art will give the relation:

$$v_{cr}^2 = \frac{2}{m}\sqrt{kEI} \quad (4)$$

A couple of passages at different speeds are often required in order to see increasing asymmetry in the deflection shape and from that determine unknown terms for Eq. 3 and 4.

Calibration

The geometrical irregularities measured with the sensor array will differ from time to time for various reasons. The wheel-rail contact position will vary and cause small variation of height between the car body where sensors are mounted and the rail. The suspension system of wheel and bogie of the car will also cause variations in height. To some extent, an inertial measurement platform close to the sensor array with accelerometers and gyros can compensate for this. An accurate calibration is important where it is ascertained that the whole sensor array has the same height reference. This can e.g. be done with a steel rural with defined straightness combined with an accurate inclinometer.

Remaining variations can be included as an error state in the numerical solution.

Numerical Solution/Implementation of the Invention

There exists a range of methods to make parameter adjustments of a model in order to fit the model to measurements and in that way estimate the parameters. One such method is the Kalman filter which exists in several different variants depending on model complexity and linearity/non-linearity. Examples of other methods are the family of adaptive filters and sequential Monte Carlo methods.

A Kalman filter works on discrete data. The standard denotation of a Kalman-filter state is x. In the following n denotes discretization of the position along the track and x denotes the Kalman filter state.

A Kalman filter that determines the structural parameters of Eq. 1-2 is described in Eq. 5-14. The basic equation (Eq. 5) describes the position-update ($\underline{x}(n+1)$) solving for next position along the track and the measurement update ($\underline{y}(n)$). In this implementation, the position update is linear with the transfer matrix F, and process noise v(n). The measurement update is non-linear for some states and linear for others. This is described with the non-linear function h( ) which is dependent on the filter states $\underline{x}(n)$ and the measurement noise $\underline{e}(n)$. Underline denotes a vector and a line above the symbol denotes a matrix.

$$\underline{x}(n+1) = \overline{F}\underline{x}(n) + \underline{v}(n) \quad \underline{y}(n) = h(\underline{x}(n), \underline{e}(n)) \quad (5)$$

The covariance of v(n) is denoted $Q_{cov}(n)$ and the covariance of e(n) is denoted $R_{cov}(n)$. The state vector x(n) contains the following states:

$$\underline{x}(n)^T = [\underline{W}(n) \ \underline{S}(n) \ \underline{T}_{SFT}(n) \ \underline{\mu}(n) \ \underline{\gamma}(n) \ \underline{Q}(n)] \quad (6)$$

The vectors $\underline{W}(n)$ and $\underline{S}(n)$ contain necessary derivatives at samples spanning the whole distance of the sensor array according to:

$$\underline{W}(n)^T = \lfloor w(n)\ w''(n)\ w^{(4)}(n)\ w(n-1) \ldots w(n-m)\ w''(n-m)\ w^{(4)}(n-m) \rfloor \quad (7)$$

$$\underline{S}(n)^T = [s(n)\ s''(n)\ s(n-1)\ s''(n-1) \ldots s(n-m)\ s''(n-m)] \quad (8)$$

Searched parameter vectors $\underline{T}_{sft}$, $\mu$, $\gamma$, $Q$ also span the interval between n and n-m., as showed for modulus $\mu$ in Eq. 9.

$$\underline{\mu}(n)^T = [\mu(n)\ \mu(n-1)\ \mu(n-2) \ldots \mu(n-m+1)\ \mu(n-m)] \quad (9)$$

In one example of the invention n is the position at 3.5 m to the right of the wheel, at the first sensor position, and n-m is the position at 0.5 m to the right of the wheel at the fourth (last) sensor. These four sensor positions are indicated in FIGS. 1 and 2. If the sampling frequency $f_s$ is 10 samples per meter, $\Delta n=0.1$ m, the number of states x, will be 279 ($\underline{W}$-93 states, $\underline{S}$-62 states, $\underline{T}_{sft}$-31 states, $\underline{\mu}$-31 states, $\underline{\gamma}$-31 states, $\underline{Q}$-31 states).

The position update matrix $\overline{F}$ will consist of a number of sub-matrixes shown in Eq. 10.

$$\overline{F} = \begin{bmatrix} \overline{F_W} & 0 & 0 & 0 & 0 & 0 \\ 0 & \overline{F_S} & 0 & 0 & 0 & 0 \\ 0 & 0 & \overline{F_T} & 0 & 0 & 0 \\ 0 & 0 & 0 & \overline{F_\mu} & 0 & 0 \\ 0 & 0 & 0 & 0 & \overline{F_\gamma} & 0 \\ 0 & 0 & 0 & 0 & 0 & \overline{F_Q} \end{bmatrix} \quad (10)$$

$\overline{F_W}$ and $\overline{F_Y}$ will be built on the symmetrical numerical double derivative:

$$w''(n) = f_s^2 (w(n+1) - 2w(n) + w(n-1)) \quad (11)$$

Taking the position update (from $x(n)$ to $x(n+1)$) and expanding the derivatives leads to:

$$\begin{cases} w^{(4)}(n+1) = w^{(4)}(n+1) + v_{(w4)}(n) \\ w''(n+1) = \dfrac{w''(n+2)}{2} + \dfrac{w''(n)}{2} - \dfrac{w^{(4)}(n+1)\Delta n^2}{2} + v_{(w2)}(n) \\ w(n+1) = \dfrac{w(n+2)}{2} + \dfrac{w(n)}{2} - \dfrac{w''(n+2)\Delta n^2}{4} - \dfrac{w''(n)\Delta n^2}{4} + \dfrac{w^{(4)}(n+1)\Delta n^4}{4} v_{(w0)}(n) \end{cases} \quad (12)$$

and $$\begin{cases} s''(n+1) = s''(n) + v_{s2}(n) \\ s(n+1) = \dfrac{s(n-1)}{2} + \dfrac{s(n+1)}{2} - \dfrac{s''(n)\Delta n^2}{2} + v_{s0}(n) \end{cases} \quad (13)$$

which fill basis for $\underline{F}_w$ and $\underline{F}_s$.

The remaining sub-matrixes of F, can be unity matrixes as an adequate position-update is the last estimate.

The measurement update includes both linear and non-linear updates. The linear measurement update is naturally measurements from the sensors as in Equation 14. With $\Delta n=0.1$ m, 10 samples shift corresponds to one meter, and as seen from the equation, sensors are placed at one meters distance from each other in this example.

$$\begin{cases} y_1(n) = w(n) + s(n) + e_1(n) \\ y_2(n) = w(n-10) + s(n-10) + e_2(n) \\ y_3(n) = w(n-20) + s(n-20) + e_3(n) \\ y_4(n) = w(n-30) + s(n-30) + e_4(n) \end{cases} \quad (14)$$

As can be seen from the equation and also from FIGS. 2-4, sensor measurements are a combination of deflection ($w(n)$) and geometrical irregularities ($s(n)$) together with a measurement error ($e(n)$).

Measurements of the wheel force can easily be incorporated as a measurement update if sensors for measuring wheel force are available.

Finally, the non-linear measurement updates tie the model from Eq. 1 with estimated values of deflection and geometrical irregularities. This can be executed for each position spanned by the sensor array, or in order to reduce calculation complexity, only at the positions of the sensors as outlined in Eq. 15.

$$\begin{cases} y_5(n) = \gamma(n) E I w^{(4)}(n) + \alpha E A (T_{sft}(n) - T(n)) w''(n) + \\ \qquad \mu(n) w(n) + \alpha E A (T_{sft}(n) - T(n)) s''(n) + e_5(n) \\ y_6(n) = \gamma(n-10) E I w^{(4)}(n-10) + \\ \qquad \alpha E A (T_{sft}(n-10) - T(n-10)) w''(n-10) + \\ \qquad \mu(n-10) w(n-10) + \\ \qquad \alpha E A (T_{sft}(n-10) - T(n-10)) s''(n-10) + e_6(n) \\ y_7(n) = \gamma(n-20) E I w^{(4)}(n-20) + \\ \qquad \alpha E A (T_{sft}(n-20) - T(n-20)) w''(n-20) + \\ \qquad \mu(n-20) w(n-20) + \\ \qquad \alpha E A (T_{sft}(n-20) - T(n-20)) s''(n-20) + e_7(n) \\ y_8(n) = \gamma(n-30) E I w^{(4)}(n-30) + \\ \qquad \alpha E A (T_{sft}(n-30) - T(n-30)) w''(n-30) + \\ \qquad \mu(n-30) w(n-30) + \\ \qquad \alpha E A (T_{sft}(n-30) - T(n-30)) s''(n-30) + e_8(n) \end{cases} \quad (15)$$

The measurement updates $y_5(n)$-$y_8(n)$ are formed to equal to zero.

To have the wheel-force influencing the measurement equation directly, a closed form solution of Eq. 1 could be implemented as a measurement update. Another alternative is to extend the equations with states to include also the wheel position.

The non-linear measurement update is implemented with for example an extended Kalman filter or an unscented Kalman filter.

From an initial estimate, the Kalman filter improves the estimate as position-updates and measurement updates progress. Normally some 10-20 meters are needed to separate deflection from geometrical irregularities and to give adequate determination of structural parameters.

The invention claimed is:

1. A method of monitoring a railway track to ensure safe travel, the method comprising:
   determining structural parameters of a rail using a measurement system comprising: a railway car configured as a measurement vehicle, the measurement vehicle including a sensor array mounted on one side of a wheel and configured to measure at least vertical and/or lateral irregularities of the rail under influence of different loads at a plurality of points along the rail, and at different distances from the wheel of the measurement vehicle, the sensor array further configured to provide signals corresponding to said irregularities, the sensor array being positioned in the railway car adjacent to a contact point between the wheel and the rail; and a processor configured to process the signals from the sensor array;

with the measurement vehicle moving on the rail, measuring at least the vertical and/or lateral irregularities of said rail with the sensor array along the rail, thereby providing the signals corresponding to the irregularities at the different distances from the wheel, and under the influence of the different loads;

providing a model describing a deflection shape of the rail, wherein the deflection shape is dependent on the structural parameters of the rail and on loads on the rail, said model being stored in the processor; and comparing said irregularities under the influence of the different loads in order to separate deflection due to wheel loads from non-loaded geometrical irregularities, thus generating a measured deflection shape;

generating at least one theoretical rail deflection shape using the model by varying the structural parameters and the load in the model; and comparing the at least one theoretical rail deflection shape with said measured deflection shape for each point along the rail;

determining the structural parameters of the at least one theoretical rail deflection shape which best matches said measured deflection shape.

2. The method according to claim 1, wherein the loads on the rail are the wheel loads and temperature induced longitudinal loads in the rail.

3. The method according to claim 2 wherein the structural parameters are selected from track modulus, stress free temperature of the rail, bending moment of the rail, track damping, and critical ground speed.

4. The method according to claim 1 wherein the structural parameters are selected from track modulus, stress free temperature of the rail, bending moment of the rail, track damping, and critical ground speed.

5. The method according to claim 4, wherein the stress free temperature of the rail is obtained by measuring the rail temperature with a thermometer and comparing with a stress free state.

6. The method according to claim 1, wherein the sensor array for measuring said irregularities comprises any of lasers, laser and camera, laser-doppler for velocity, and radar.

7. The method according to claim 1, wherein the model describing the deflection shape of the rail is selected from a linear or nonlinear beam model with foundation or a linear or nonlinear FEM-model.

8. The method according to claim 1, wherein the step of comparing the least one of said theoretical deflection shapes includes use of any of Kalman filters, adaptive filters or sequential Monte Carlo methods.

9. The method according to claim 1, wherein in order to compare deflection shapes before and after the wheel or a bogie for critical speed determination, an additional sensor array is mounted on an other side of the wheel or the bogie in a longitudinal direction, and measuring said irregularities, thus making it possible to detect non-symmetric deflection shape when comparing the deflection shapes before and after the wheel.

10. An apparatus for determining structural parameters of a rail track having a measurement system comprising:

a processor;

a sensor array positioned in a railway car adjacent to a contact point between a wheel of the railway car and a rail, the sensor array configured to measure at least vertical and/or lateral irregularities of the rail under influence of different loads at a plurality of points along the rail, and at different distances from the wheel of the railway car, and to provide signals corresponding to said rail irregularities to the processor, wherein the processor is configured to process the signals from the sensor array, the processor being provided with a model describing a deflection shape of the rail, wherein the deflection shape is dependent on the structural parameters of the rail and on loads on the rail, said model being stored in the processor, the processor being further configured to perform the steps of:

comparing said irregularities under influence of different loads in order to separate deflection due to wheel loads from non-loaded geometrical irregularities, thus generating a measured deflection shape;

generating at least one theoretical rail deflection shape using the model by varying the structural parameters and the load in the model;

comparing the at least one theoretical rail deflection shape with said measured deflection shape for each point along the rail; and determining the structural parameters of the at least one theoretical rail deflection shape which best matches said measured deflection shape.

11. The apparatus according to claim 10, wherein the sensor array comprises sensors on both sides of the wheel in a longitudinal direction.

12. The apparatus according to claim 11, further comprising: a thermometer for measuring the rail temperature.

13. The apparatus according to claim 10, further comprising: a thermometer for measuring the rail temperature.

* * * * *